United States Patent Office.

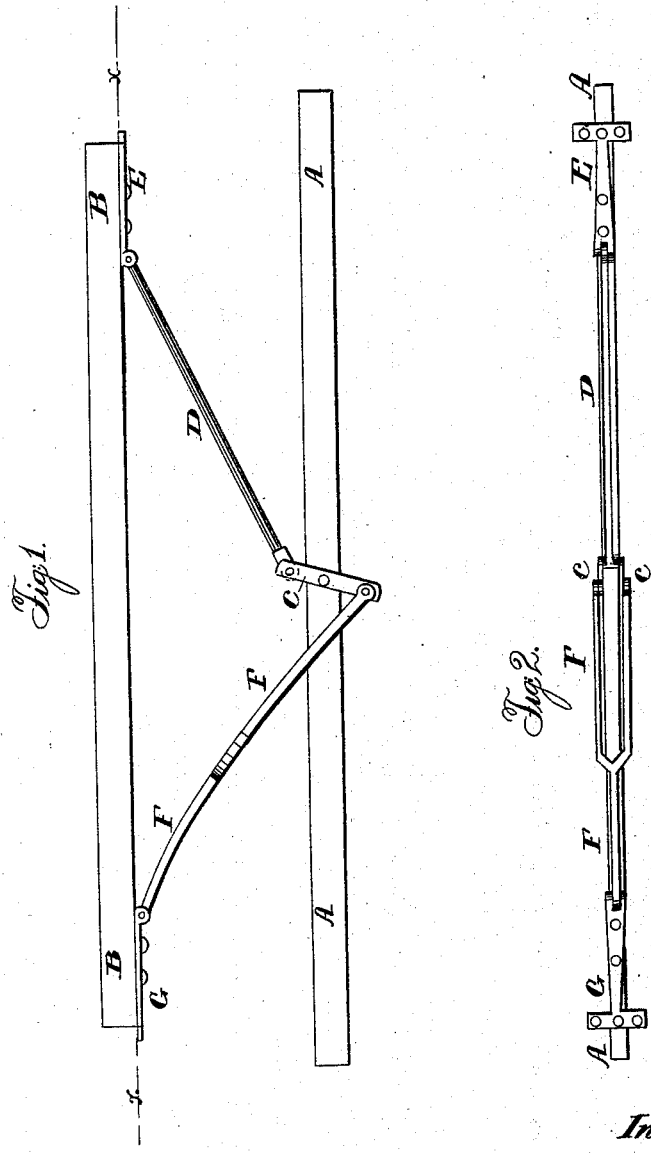

IMPROVEMENT IN BRACES FOR WAGON SPRINGS.

JAMES H. LOCKIE, OF HUMPHREY, NEW YORK.

Letters Patent No. 60,393, dated December 11, 1866.

---

The Schedule referred to in these Letters Patent and making part of the same.

---

TO ALL WHOM IT MAY CONCERN:

Be it known that I, JAMES H. LOCKIE, of Humphrey, in the county of Cattaraugus, and State of New York, have invented a new and useful Improvement in Braces for Wagon Springs; and I do hereby declare that the following is a full, clear and exact description thereof, which will enable others skilled in the art to make and use the same, reference being had to the accompanying drawings, forming part of this specification, in which—

Figure 1 is a side view of my improved braces, attached to the reach and box frame of a wagon.

Figure 2 is a horizontal sectional view of the same, taken through the line $x\ x$, fig. 1.

Similar letters of reference indicate like parts.

My invention has for its object, to prevent the backward and forward swaying, and the consequent twisting and breaking of wagon, carriage and buggy springs. And it consists in the combination of levers, rods and T braces with each other, and with the reach and box frame of the wagon, as hereinafter more fully described. A is the reach of the wagon, about the construction of which there is nothing new. B is the part of the box frame which supports the middle part of the bottom of the box. C are two short levers, which are pivoted to the middle part of the reach A, by a bolt passing through the centres of said levers and through the reach, as shown in fig. 1. D is a rod, the lower end of which is pivoted between the upper ends of the two levers, C, and its upper end is pivoted to the inner end of the T brace E. F is a rod, the upper end of which is pivoted to the inner end of the T brace G, as shown in figs. 1 and 2. The lower part of the rod F is divided into two branches or arms, as shown in fig. 2, which pass down on each side of the reach A, and the lower ends of which are pivoted to the lower ends of the levers C. The inner or long arms of the T braces E and G, are securely attached to the box frame of the wagon, with the T part of said braces projecting. This part is firmly secured to the upper part of the springs, and braces them against twisting, and at the same time the holes for the passage of the bolts through the springs, being more in number, do not require to be so large as when the springs are secured in the ordinary manner, and consequently the springs are not so much weakened by said holes, and are not so liable to break. This device also causes the springs always to act in a line perpendicular to the plane of the wagon, whether the wagon is going up or down hill, or upon a level. It also guards the springs from being strained or broken by a sudden jerk, the tendency of which is to draw the running part of the wagon from under the box, which tendency is resisted by my improvement, and the running part and box are made to move on together. If desired, the short levers C may be pivoted to the box frame, and the T braces E and G, attached to the ends of the reach and to the lower part of the springs. This improvement is designed to be attached to all kinds of spring wagons, carriages, and buggies, whether they are hung upon elliptic or half-eliptic springs. It is also designed to be attached to the springs of wagon seats, to protect them in the same manner that it protects wagon springs.

I claim as new, and desire to secure by Letters Patent—

The combination of the short levers C, connecting rods D and F, and the T braces E and G, with each other and with the reach A and box-frame B of the wagon, substantially as herein shown and described, and for the purpose set forth.

The above specification of my invention signed by me this 28th day of August, 1866.

JAMES H. LOCKIE.

Witnesses:
WM. F. MCNAMARA,
JAMES T. GRAHAM.